United States Patent
Bharatia

[19]

[11] Patent Number: 6,138,007
[45] Date of Patent: Oct. 24, 2000

[54] METHODS AND SYSTEMS FOR LATE CALL FORWARDING WHEN ROAMING FROM GSM SYSTEM TO IS41 SYSTEM

[75] Inventor: Jayshree Bharatia, Plano, Tex.

[73] Assignee: Nortel Networks Corporation, Montreal, Canada

[21] Appl. No.: 08/980,103

[22] Filed: Nov. 26, 1997

[51] Int. Cl.[7] .................................................. H04Q 7/22
[52] U.S. Cl. ........................ 455/414; 455/432; 455/445
[58] Field of Search .................................... 455/414, 417, 455/432, 433, 435, 445, 524, 560

[56] References Cited

U.S. PATENT DOCUMENTS

| | | | |
|---|---|---|---|
| 5,222,123 | 6/1993 | Brown et al. | 455/417 |
| 5,526,400 | 6/1996 | Nguyen | 455/432 |
| 5,826,191 | 10/1998 | Krishnan | 455/435 |
| 5,862,481 | 1/1999 | Kulkarni et al. | 455/432 |
| 5,867,784 | 2/1999 | Lantto | 455/414 |
| 5,884,180 | 3/1999 | Bertacchi | 455/445 |
| 5,933,784 | 8/1999 | Gallagher et al. | 455/433 |
| 5,978,673 | 11/1999 | Alperovich et al. | 455/417 |

*Primary Examiner*—Edward F. Urban
*Attorney, Agent, or Firm*—Carr & Storm, L.L.P.

[57] ABSTRACT

Disclosed is an apparatus for and a method of providing late call forwarding when a dual mode GSM/IS41 type mobile station has roamed from its home GSM network to a North American IS41 type cellular network. The GSM network functionally supports the GSM Optimal Routing technical specification whereby the address of the gateway GSM MSC is supplied to the interconnected IWU. When the IWU receives a redirect request from the terminating IS41 MSC (MTSO) upon failure to connect to the roaring MS, the IWU tells the GSM originating gateway MSC to resume call handling. The originating gateway MSC then completes the late call forwarding process using the call forwarding number as a forwarding address.

6 Claims, 3 Drawing Sheets

METHODS AND SYSTEMS FOR LATE CALL FORWARDING WHEN ROAMING FROM GSM SYSTEM TO IS41 SYSTEM

TECHNICAL FIELD

The present invention relates in general to cellular communication systems and in particular to methods and systems for completing "late call forwarding" when a dual mode GSM mobile station has roamed to an IS41 network and a call to that mobile station is not terminated.

BACKGROUND

Throughout the remainder of this patent application, the term MS refers to a "mobile station" whether operating in a GSM (Global Systems for Mobile communications) type cellular network or in an IS41 (TIA/EIA [Telecommunications Industry Association/Electronic Industries Association] Interim Standard 41) type network. Further, reference to an MS successfully roaming to an IS41 network would be a dual mode (GSM/IS41) MS (an MS that includes transmitters and receivers that can operate in either a GSM or a IS41 environment) which has roamed from its home base GSM provider network and has had its most recent operational contact with an IS41 MSC (Mobile services Switching Center).

In order to allow roaming between "foreign" type networks, a signalling message converter, referred to herein as an IWU (InterWorking/interoperability Unit) operates to interconnect calling and called MSCs. The IWU passes signalling messages back and forth between network entities while converting the format of these messages such that the messages can be properly interpreted by the receiving MSC. A VLR (Visitor Location Register) is a network entity responsible for storing roaming information related to a subscriber. The MSC and VLR entities may or may not be co-located. If they are not co-located, the MSC is responsible for transferring information to the VLR whenever applicable. The IWU is also responsible for keeping VLR and HLR (Home Location Register) data of roaming MSs for the use of connected networks. While the switch in a IS41 network is normally designated as a MTSO (Mobile Telecommunications Switching Office), it is functionally equivalent to an MSC and will be referred to as such for convenience in some parts of the following description.

Although as shown in the accompanying drawings the gateway MSC, the call originating MSC and the home MSC of the roaming MS are the same unit for ease of illustration, these three terms may also refer to three different GSM MSCs. It should also be noted that although the originating caller is shown as a GSM MS and phone to which the call is forwarded is shown as a GSM MS, either or both of these units may be land line phones or phones of completely different type networks from the GSM and IS41 networks shown.

As is known to those skilled in the art, committees were formed to set forth the standards by which cellular systems should work so that equipment from various manufacturers would work together in a given system. However GSM standards are inherently different from the IS41 standards mentioned above. One of these differences is in the operation of "late call forwarding" or the action of the system when a call to a MS cannot be terminated for any of several specific reasons like call collision, no page response of a page request sent to the called MS, and the like. The word terminated as used in the previous sentence refers to the completion of the action of setting up the connection and should not be confused with the completion of the communication that occurs after the connection in finalized. A GSM system expects the destination (call terminating) MSC to handle the call forwarding while an IS41 system expects the originating or home MSC of the MS being called to handle the call forwarding. The standards of IS41, in an attempt to cover the solution to various problems, allowed cellular systems to alternatively have the terminating MSC provide call forwarding when an attempt to terminate the call, by the home location MSC of the MS being called, failed.

As is known by those skilled in the art, call forwarding may occur when a call, to a given mobile station (MS), cannot be terminated (connection completed). The call forwarding can be "early" or "late".

Early call forwarding is defined as occurring when a contact with the MS has failed due to predetermined circumstances occurring while attempting to extend the call to another network.

Late call forwarding is defined as occurring when call forwarding is initiated after the call has been extended to the last known "foreign" public land mobile network location and contact with the MS has failed due to predetermined circumstances.

A NAIG (North American Interest Group) specification committee has attempted to specify interworking, interoperability and interconnection standards to ensure seamless operation of late call forwarding service across GSM type systems and IS41 type systems. By definition herein, seamless service is where MS users are able to roam to other systems from a home system and both make and receive calls in either system in an identical manner as far as the user is concerned. The NAIG approach was to emulate the GSM system by having the terminating MSC (MTSO) handle late call forwarding when a GSM MS was roaming in a IS41 network. The prior art IWU was designed to operate in accordance with the NAIG approach and accordingly late call forwarding was only accomplished in those few instances where the IS41 network supports this functionality in the optional manner of allowing the terminating MSC to provide call forwarding when an attempt to forward the call, by the home location MSC of the MS being called, failed.

SUMMARY OF THE INVENTION

According to one embodiment of the present invention, a signalling message converter signals the appropriate MSC in a local GSM system to resume call handling when a terminating foreign MSC cannot terminate the call due to predetermined circumstances.

BRIEF DESCRIPTION OF THE DRAWINGS

For a more complete understanding of the present invention, and its advantages, reference will be made in the following Detailed Description to the accompanying drawings, in which.

DETAILED DESCRIPTION

The invention is described with reference to GSM systems which support and comply with the "Optimal Routing"

standards for late call forwarding set forth in a GSM Technical Specification designated GSM 03.79. The Optimal Routing standard requires the terminating MSC that failed to complete the call to return a "Resume Call Handling" signal or message to a gateway MSC, which in some cases will also be the "home" MSC, so that, if call forwarding is indicated, the gateway MSC can initiate call setup using the Call Forwarding number.

In this invention a gateway MSC refers to a switch which provides an interface between a local network and an external or foreign network (i.e. GSM and IS41). This gateway MSC is in charge of 1) fetching location information for MSs visiting external networks and 2) routing calls towards the switch (MSC) in the external network through which the subscriber can obtain service at that instant.

Within the standards of Optimal Routing, a routing of a call to a roaming MS can be prepared for as follows. In GSM systems modified in accordance with the above referenced GSM standard designated as Optimal Routing, the address of the GSM gateway MSC is included in the SRI (Send Routing Information) message sent to the HLR (Home Location Register). This information is also provided as part of the PRN (Provide Roaming Number) message that is sent to the IWU when calling a roaming GSM subscriber presently located in the environment of a IS41 network. Thus the HLR and IWU are provided the address information needed to contact the GSM gateway when necessary.

When a redirect request message is received by the IWU subsequent to the failure of a call being terminated in the IS41 network, the IWU of the present invention sends a resume call handling message to the GSM gateway MSC. The GSM MSC can now send a message to the IS41 MSC releasing the call placed to the IS41 and then commence call setup to complete the late call forwarding process.

Figure 1:
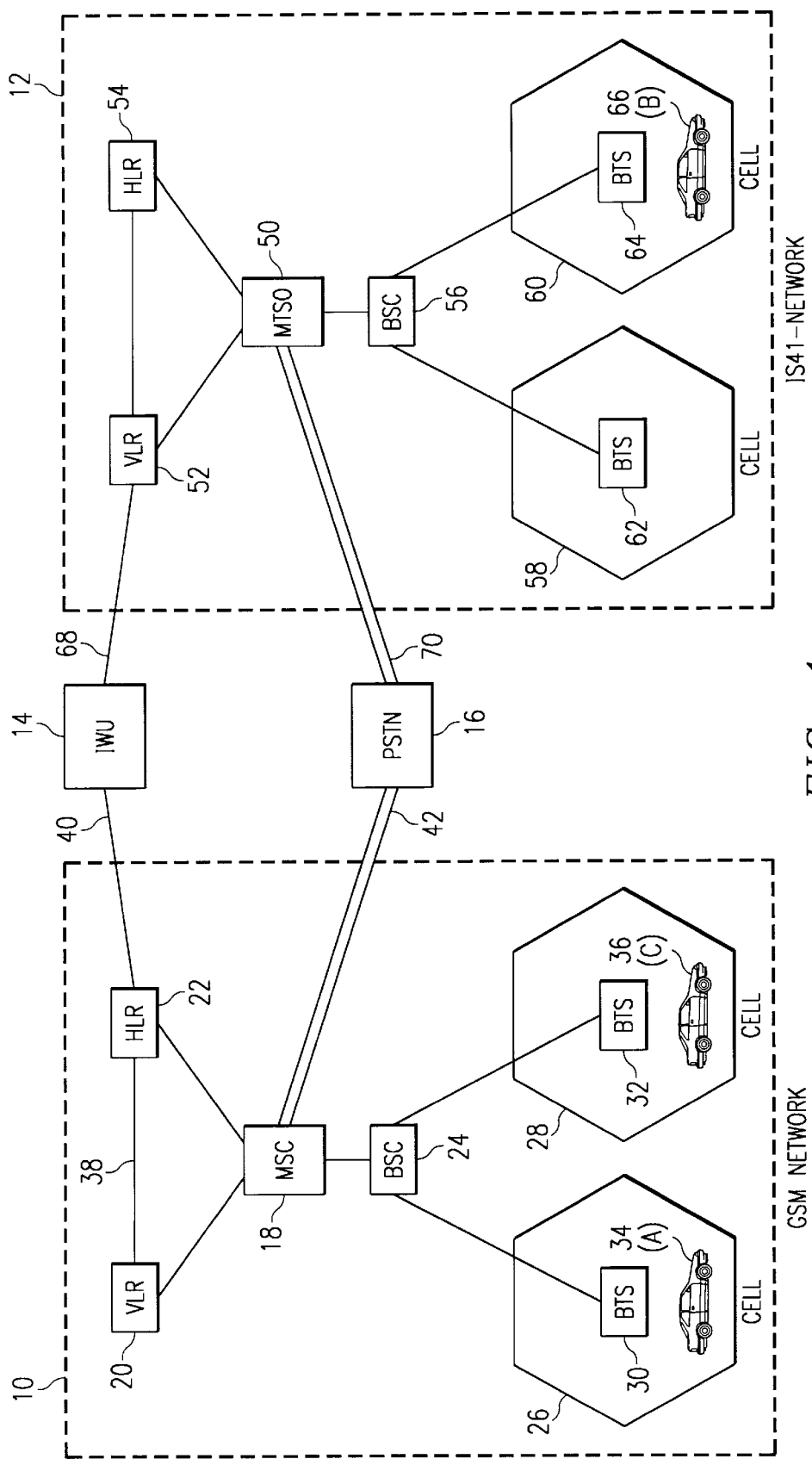
FIG. 1 illustrates two interconnected, but foreign format, cellular networks wherein signaling messages are transferred back and forth via an IWU.

In FIG. 1 a GSM cellular system network in its basic configuration is shown within a dash line block 10. A basic and similar IS41 network is shown within a dash line block 12. Also shown in the figure is an IWU (InterWorking/interoperability Unit) of block 14 and a PSTN (public switched telephone network) of block 16.

Within block 10 there is shown an MSC (Mobile services Switching Center) of block 18 connected to a VLR (Visitor Location Register) of block 20 and to a HLR (Home Location Register) of block 22. An additional direct connection 38 is illustrated between VLR 20 and HLR 22. MSC 18 is connected to a BSC (Base Station Controller) of block 24 which has a first connection to a cell 26 including a BTS (Base Transceiver Station) 30. An additional cell 28 is shown having a BTS 32 also connected to BSC 24. Within cell 26 a MS (Mobile Station) 34 represented as a car is illustrated. A farther MS 36 is shown within cell 28. The HLR 22 is connected via a message channel 40 to the IWU 14. A voice channel 42 connects the MSC 18 to a PSTN (Public Switched Telephone Network) 16.

Within block 12 there is a MTSO (Mobile Telecommunications Switching Office) of block 50 connected to a VLR block 52 and also to a HLR block 54. An MTSO is the IS41 counterpart of an MSC in a GSM system and may in some cases herein be referred as an MSC. An additional connection is shown for supplying messages directly between the VLR block 52 and HLR block 54. A BSC block 56 is connected to block 50. BSC block 56 is further connected to a BTS block 62 within a cell 58. A further BTS 64 within a cell 60 is also connected to BSC block 56. A message link 68 is shown interconnecting IWU 14 and VLR 52. A voice link is shown inter-connecting PSTN 16 and MTSO block 50. Within cell 60 there is shown a MS 66.

For the purposes of this patent application, mobile station 66 is a dual mode transceiver unit which is designed to operate and locally communicate in either a GSM or an IS41 type network. For illustrative purposes and in conjunction with the following figures, mobile station 34 will be also designated as customer "A" while mobile station 66 will be designated as customer "B". Customer 36 is further designated as "C" such that calls from customer "A" that cannot be terminated with customer "B" are to be forwarded to customer "C".

Figure 2:
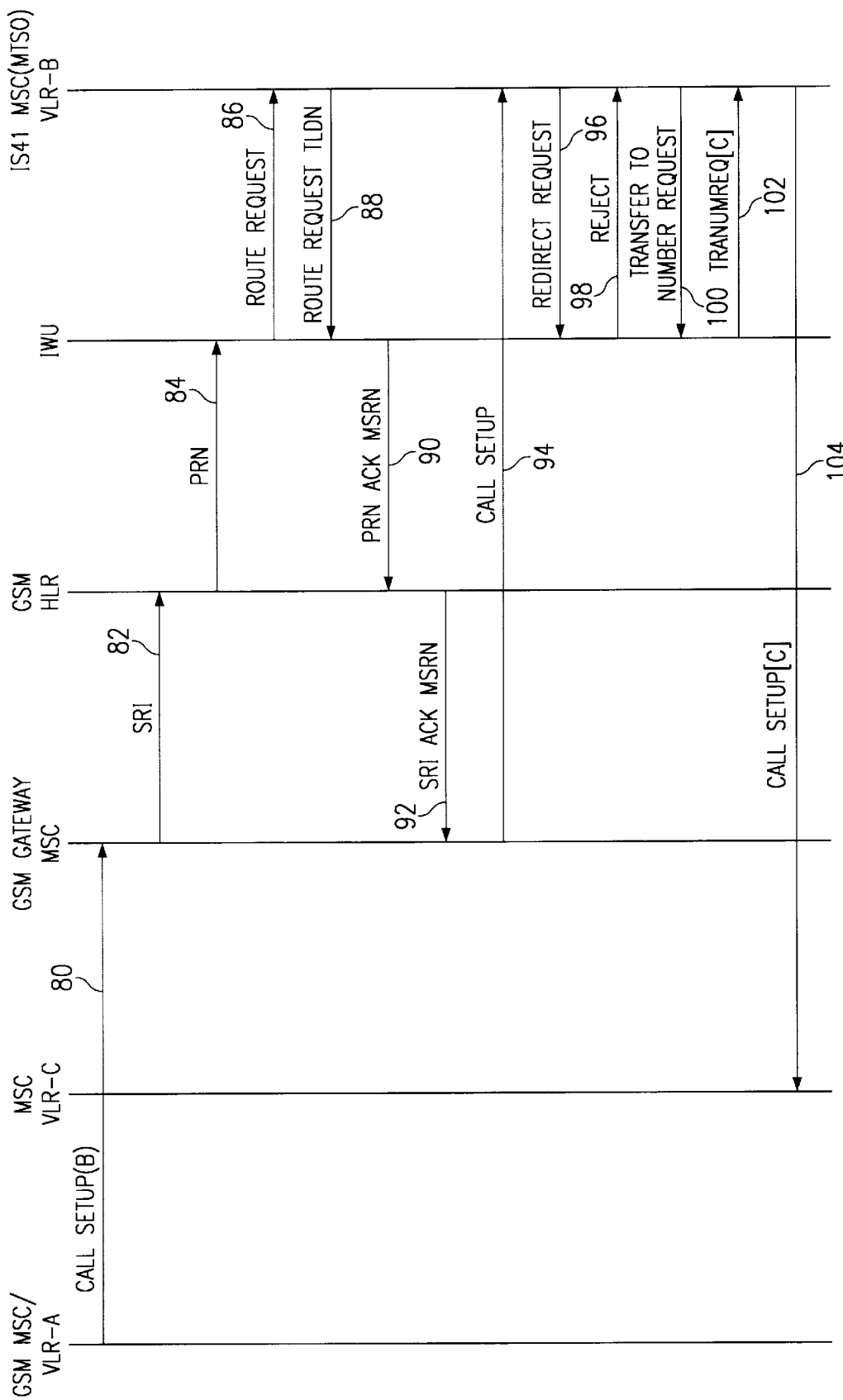
FIG. 2 is a message flow diagram illustrating the prior art late call forwarding process attempted between a GSM type cellular network and an IS41 type cellular network.

In explaining the operation of FIG. 2, it will be assumed for convenience in illustration that the MSC 18 is a gateway MSC, in addition to being a home location MSC for MS 66, that both mobile stations 34 and 36, representing callers "A" and "C", respectively, are under control of MSC 18, and further that both mobile stations 34 and 36 use the same VLR 20 and the same HLR 22. This message set diagram represents the messages transmitted between various blocks of FIG. 1 when the IS41 system optionally provides late call forwarding by the terminating MSC. As explained previously, FIG. 2 illustrates the prior art approach to late call forwarding. As will be apparent to those skilled in the art, the prior art approach failed in all instances when the IS41 network did not support the late call forwarding functionality.

Referring to both of FIGS. 1 and 2, when mobile station 34 attempts to call mobile station 66, a call setup message 80 is transmitted to the MSC 18. The call setup procedure uses the address of mobile station 66 as a subscriber address. As shown, the home MSC 18 of MS 34 is also a gateway MSC and thus the routing address of the home MSC and the gateway MSC are identical. Assuming that home location of mobile station 66 is recorded in the HLR 22, SRI (Send Routing Information) message 82 is sent from the gateway MSC to the home location register 22 to obtain routing information. The HLR 22 sends a PRN (Provided Roaming Number) message 84 to the IWU 14 for the purpose of obtaining a roaming number. If the last operational contact of mobile station 66 was within IS41 network 12, its location at that time is recorded in the IWU 14 as a part of an update location function. If IWU 14 finds mobile station 66 in its database, IWU 14 relays a route request message 86 to MSTO block 50. MSTO 50 transfers this request to VLR 52.

Block 50 returns a message 88 to IWU 14 with a roaming number to be used and which is called TLDN (Temporary Location Directory Number). IWU 14 changes the format of the TLDN to MSRN (Mobile Subscribing Mobile Number) format and provides this number in an acknowledgement message 90 to the HLR 22. Home location register 22 relays this information within a send routing information acknowledgement message 92 to MSC 18.

MSC 18 starts a call setup procedure set of messages 94 using voice channels 42 and 70 and using the provided subscriber address and routing address of mobile station 66 within network 12. If MTSO block 50 cannot terminate the call for reasons such as call collision, MS 66 being unavailable, no answer after alerting, or no response of the page request sent to the serving MS, a redirect request message 96 is returned from block 50 to IWU 14.

In accordance with the standard setup for late call forwarding occurring between GSM and IS41 systems, IWU 14 returns a reject message 98 to force the terminating switch (MTSO block 50) to perform the call forwarding function. If the network of block 12 supports the optional functionality to provide late call forwarding from the terminating switch 50, a transfer to number request message 100 is returned to IWU 14 via VLS 52. This message requests a call forwarding number stored for the called subscriber. IWU 14 sends a response message 102 to switch 50 via VLR 52. Switch 50 then initiates the call forwarding attempt to mobile station 36 using the provided forwarding number as a routing address as shown by a message of a call setup procedure 104. If IS41 block 12 does not support the functionality for terminating switch call forwarding, no further messages are transmitted beyond message 98 and the late call forwarding attempt fails.

Figure 3:
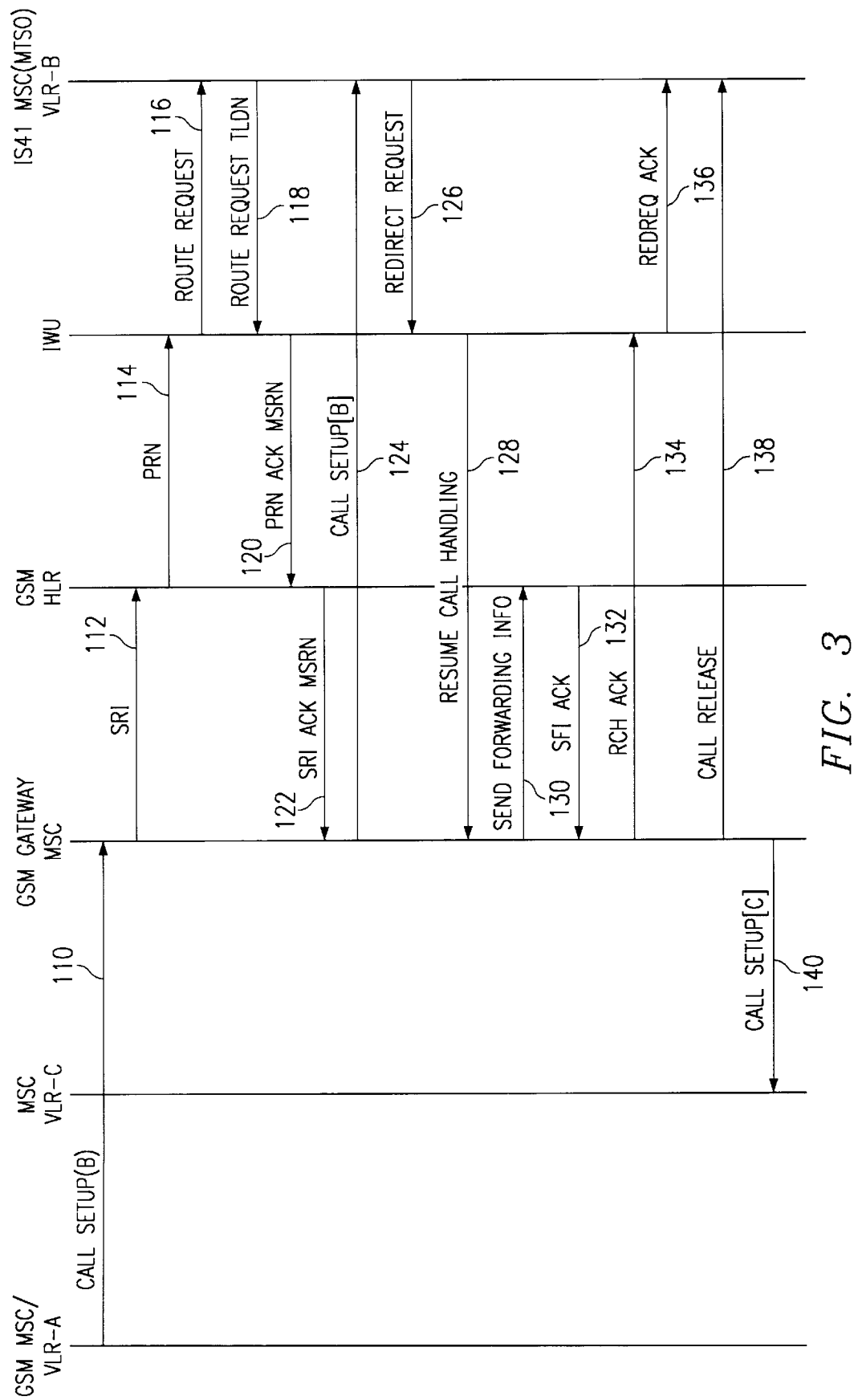
FIG. 3 is a message flow diagram showing the messages transmitted in a successful late call forwarding process where the GSM network supports the functionality of "Optimal Routing".

FIG. 3 is a message flow diagram showing use of the invention in an embodiment providing support for late call forwarding. In FIG. 3 messages from 110 through 126 are substantially identical to messages 80 through 96 in FIG. 2. However, when a GSM system is configured with Optimal Routing, the address of the gateway MSC, in this case block 18, is included as a mandatory parameter in the messages 112 and 114. Thus, the IWU 14 is provided and retains the address of the gateway MSC. When IWU 14 receives the redirect request message 126, it can, if so designed, supply a resume call handling message 128 to the MSC 18 in accordance with standards of GSM Optimal Routing. IWU 14 is programmed to and capable of sending message 128 to the MSC 18 because this information is supplied by messages 112 and 114.

Gateway MSC 18 then sends a Send Forwarding Information (SFI) message 130 to home location register 22 to ascertain where the call should be forwarded in the event that mobile station 66 can not be contacted. The information is returned in the acknowledgement message 132. A resume call handling acknowledgement message 134 is returned to IWU 14. The IWU 14 then supplies a redirect request acknowledgement message 136 to MTSO 50. At this time gateway MSC 18 sends a call release message 138 to switch 50 to release the previous call setup. The call release procedure also take place over voice channels 42 and 70. At this time, MSC 18 may commence a set of call setup messages 140 as the final step in forwarding the call initiated by mobile station 34 and finally being forwarded to mobile station 36.

The apparatus and method described provides late call forwarding when a dual mode GSM/IS41 type mobile station has roamed from its home GSM network to a North American IS41 type cellular network. The home GSM network, is configured according to the GSM Optimal Routing technical specification whereby home location register data is supplied to the interconnected IWU. When the IWU receives a redirect request from the terminating IS41 MSC (MTSO) upon failure to connect to the roaming MS, the IWU tells the GSM gateway MSC to "resume call handling". The gateway MSC then completes the late call forwarding process.

Although the invention has been described with reference to a specific embodiment, these descriptions are not meant to be construed in a limiting sense. Various modifications of the disclosed embodiment, as well as alternative embodiments of the invention, will become apparent to persons skilled in the art upon reference to the description of the invention. It is therefore, contemplated that the claims will cover any such modifications or embodiments that fall within the true scope and spirit of the invention.

What is claimed is:

1. An interworking/interoperability unit apparatus for converting signalling messages exchanged between GSM and IS41 type cellular communication systems when a GSM type MS (Mobile Station) roams into an IS41 network, the apparatus comprising:

means for detecting the receipt of a provide roaming number message, the provide roaming number message including the address of a gateway MSC;

means for detecting the receipt of an IS41 redirect request message; and means for sending a GSM resume call handling message to said gateway MSC upon detection of receipt of said IS41 redirect request message.

2. A method of completing late call forwarding when a call from a GSM type MS in a GSM network cannot be terminated to a GSM MS that has roamed to an IS41 type cellular network, the method comprising the steps of:

receiving a provide roaming number message by an IWU interconnecting the GSM and IS41 networks, said provide roaming number message including the address of a gateway MSC;

detecting the receipt of an IS41 redirect request message by said IWU; and sending a GSM resume call handling message from said IWU to said gateway MSC upon detection of receipt of said IS41 redirect request message.

3. A cellular communication apparatus, comprising:

a GSM network apparatus including at least a gateway MSC;

an IS41 type cellular network apparatus including at least one MSC;

a roaming dual mode GSM/IS41 MS apparatus having made most recent operational contact with said IS41 MSC;

an IWU apparatus interconnecting the GSM and IS41 networks;

means for receiving a provide roaming number message, said provide roaming number message including the address of a gateway MSC;

means for detecting the transmission of an IS41 redirect request message from said IS41 network to said IWU; and means for sending a GSM resume call handling message to said gateway MSC upon detection of receipt of said IS41 redirect request message by said IWU.

4. A method of completing late call forwarding when a call to a GSM type MS that has roamed to an IS41 type cellular network in a GSM network cannot be terminated to said GSM MS, the method comprising the steps of:

receiving a provide roaming number by an interconnecting IWU, said provide roaming number message including the address of a gateway MSC of said GSM network;

detecting the transmission of an IS41 redirect request message from said IS41 network to said interconnecting IWU; and sending a GSM resume call handling message to said gateway MSC of said GSM network upon detection of receipt of said IS41 redirect request message by said IWU.

5. The method of claim 4 where the GSM network functionally supports optimal routing.

6. A method of performing late call forwarding when a roaming dual mode GSM MS apparatus has made its most recent operational contact with an IS41 MSC, the method comprising the steps of:

receiving a provide roaming number message, said provide roaming number message including a gateway message address;

detecting the transmission of an IS41 redirect request message; and sending a GSM resume call handling message to said gateway MSC upon detection of said IS41 redirect request message.

* * * * *